UNITED STATES PATENT OFFICE.

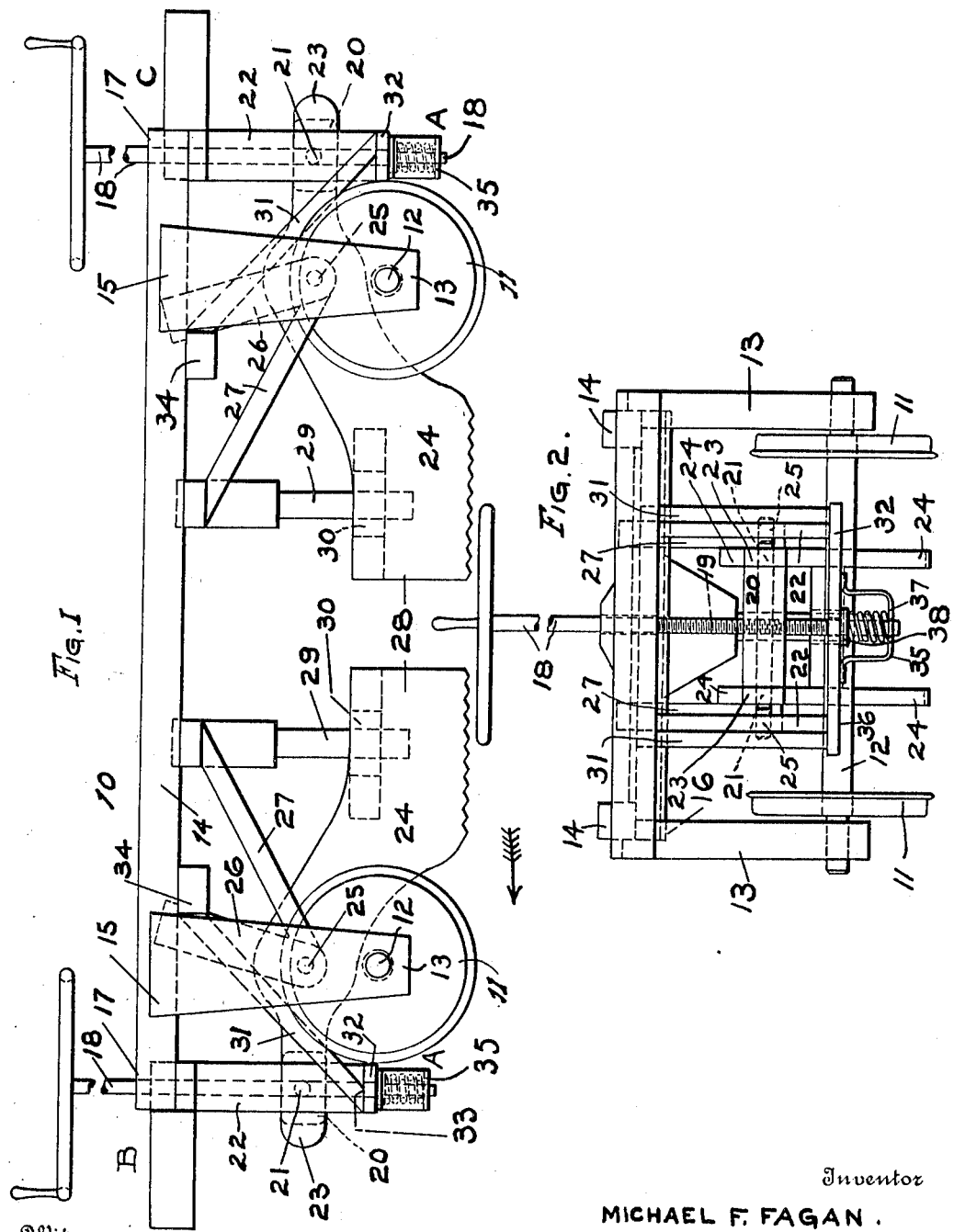

MICHAEL F. FAGAN, OF ALTOONA, PENNSYLVANIA.

DRAG-BRAKE FOR RAILWAY-CARS.

1,096,418.

Specification of Letters Patent.

Patented May 12, 1914.

Application filed April 12, 1912. Serial No. 690,407.

*To all whom it may concern:*

Be it known that I, MICHAEL F. FAGAN, a citizen of the United States, residing at Altoona, in the county of Blair and State of Pennsylvania, have invented certain new and useful Improvements in Drag-Brakes for Railway-Cars, of which the following is a specification.

This invention relates to drag brakes for railway cars, and its object is to provide a strong and effective emergency brake, adapted to engage the road-bed when the same is applied.

Another object of this device is to provide a resilient brake shaft, such, that when the brake is applied the uneven road-bed will not destroy the brake rigging on the car.

A further object of the device is to provide a swivel block through which the brake shaft protrudes, such, that the screw threads in the block do not bind on the brake shaft.

With these and many other objects in view, which will be more readily apparent, as the nature of the invention is better understood, the same consists in the novel construction, combination and arrangement of parts as will be hereinafter more fully described, illustrated and claimed.

The essential features involved in carrying out the above named object are, necessarily, susceptible to a wide range of structural modification, without departing from the spirit or scope of the invention, but a preferred and practical embodiment of the invention is shown in the accompanying drawings, in which:—

Figure 1 is a side elevation of a car having my improved brake applied thereto. Fig. 2 is an end elevation of the parts shown in Fig. 1.

Like reference numerals designate corresponding parts throughout the several figures of the drawings.

In carrying out this invention no change is necessary in the car body, or underframing of the car; all that is necessary for its application being to provide suitable bracing for the brake members, whereby the re-action of the applied brake is transmitted to the underframing of the car. To this end the invention contemplates a car designated in its entirety by the numeral 10, and for illustrative purposes there is shown at either end a two-wheel truck 11, the car 10 being supported on the axles 12, through the medium of the upright pieces 13, which are adapted to engage the side sill 14 of the car at the point 15. The upright pieces 13 are preferably made with a shoulder 16 at the top which engages the side sill 14, after which the parts are secured together by any approved and suitable means.

Positioned at the ends 17 of the car, a brake shaft 18, provided with threads 19, engages a block 20, which is swiveled at 21 between the arms 23 of the brake lever 24, such, that when the brake is applied or released, the brake shaft does not bind in the block. It is obvious that a rigidly mounted brake of this type would soon be destroyed on the uneven surface of the ordinary road-bed, and for the purpose of making the parts so that they will absorb the sudden shocks and stresses, there are provided the bracket arms 22, secured to the underside of the car body on each side of the brake shaft 18, which have fast to their lower ends a bar 32 which carries on its under-face 36 a brake shaft cushion element A. The bar 32 is held rigidly in position by the brace 31 which is connected thereto at 33 and to the car body at 34. The brake shaft 18 passes through an opening in the bar 32 and has suitably fixed thereto a collar 38 which abuts against the underside 36 of the bar 32. The cushion element A carried by the bar 32 comprises a stirrup 35 which also has an opening in its bottom bar to permit the passage of the brake shaft 18, and a coil spring 37 which surrounds the end of the shaft 18 and abuts against the bottom bar of the stirrup 35 and the collar 38 on the shaft, thus tending to push the shaft 18 in an upward direction. Accordingly, when the braking faces of the lever 24 are forced into contact with rough road surface, the ends 23 thereof on the opposite side of the fulcrum 25 will be forced up and down and carry the brake shaft 18 which is threaded through the block 20 that is swiveled between the arms 23, with them against the resilience of the spring 37.

The drag brake lever 24, it will be observed, is preferably fulcrumed, as at 25, above the car axles 12, the fulcrum point being suspended by the brace members 26 and 27. In order to prevent the brake lever from being wrenched from its fulcruming point 25, when the same is in contact with the road-bed, especially when rounding curves, the end 28 of each lever is provided with the longitudinal slot 30 which accommodates a rigid guide post 29 that extends downward from the bottom of the car.

It will be observed from the drawings that there is an oppositely disposed braking mechanism at each end of the car, so that the one at the front of the car can always be used. Assuming that the car is moving in the direction of the arrow, the brake mechanism B will be used to brake the car, while the mechanism C will be entirely out of action.

In order to apply the brake B it is only necessary to rotate the hand wheel on top of the brake shaft 18 in such a direction that the threads 19 which pass through the block 20 will cause the block to move upwardly, and because the latter is swiveled between the arms 23 of the brake 24 it will pull the said arms up with it, leaving the shaft 18 perpendicular, and forcing the end 28 of the beam 24 down into contact with the road-bed because the said end is on the opposite side of the fulcrum 25 from what the ends 23 are. Thus the brake can be forced into the road-bed as much as necessary to brake the car. To release the brake from contact with the road-bed the hand wheel must be turned in a direction opposite to that turned for braking, which causes the block 20 to move down and carry with it the arms 23, thus lifting the end 28 of the lever because it is on the opposite side of the fulcrum 25 as already explained.

Without further elaboration and description, it is thought that the many advantages of the herein described invention will be readily apparent, and

What I claim and desire to secure by Letters Patent is:—

In combination with a car body, a car brake comprising a brake lever pivotally supported at an intermediate point from the car body having a braking portion on one side of the pivot, and also having a slot in its upper portion, a guide post depending from the car body and entering said slot, arms formed from the brake beam and projecting on the opposite side of the pivot, a block pivoted between the said arms, a brake shaft in threaded engagement with the said block, a bracket whose bottom bar has an opening to permit the passage of the brake shaft, a collar fixed to the brake shaft and abutting against the lower bar of the bracket, a stirrup fixed to the lower portion of the bracket, and a spring surrounding the brake shaft and interposed between the collar thereon and the said stirrup.

In testimony whereof I affix my signature in presence of two witnesses.

MICHAEL F. FAGAN.

Witnesses:
ADAM LEAKE,
EUGENE FAGAN.

---

Copies of this patent may be obtained for five cents each, by addressing the "Commissioner of Patents, Washington, D. C."